(12) United States Patent
Kuriyama et al.

(10) Patent No.: US 8,507,059 B2
(45) Date of Patent: Aug. 13, 2013

(54) MULTILAYER FILM USING SOLVENT-FREE ADHESIVE, METHOD FOR PRODUCING SAME AND PACKAGING CONTAINER

(75) Inventors: Kouji Kuriyama, Kanagawa (JP); Osamu Goto, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 118 days.

(21) Appl. No.: 13/055,695

(22) PCT Filed: Jul. 9, 2009

(86) PCT No.: PCT/JP2009/003220
§ 371 (c)(1),
(2), (4) Date: Apr. 14, 2011

(87) PCT Pub. No.: WO2010/010664
PCT Pub. Date: Jan. 28, 2010

(65) Prior Publication Data
US 2011/0189416 A1    Aug. 4, 2011

(30) Foreign Application Priority Data

Jul. 22, 2008  (JP) ................................. 2008-189219

(51) Int. Cl.
*B29D 22/00*   (2006.01)
*B29D 23/00*   (2006.01)
*B32B 1/08*    (2006.01)

(52) U.S. Cl.
USPC .... 428/35.7; 428/341; 428/423.1; 428/423.5; 428/423.7; 428/424.2; 156/60

(58) Field of Classification Search
USPC .............. 428/35.7, 341, 423.1, 423.5, 423.7, 428/424.2; 156/60
See application file for complete search history.

(56) References Cited

U.S. PATENT DOCUMENTS

| | | | |
|---|---|---|---|
| 6,462,163 B2 * | 10/2002 | Chen et al. | ...... 528/83 |
| 6,846,532 B1 * | 1/2005 | Bensur | ...... 428/35.4 |
| 2001/0012868 A1 | 8/2001 | Chen et al. | |
| 2001/0013393 A1 | 8/2001 | Chen et al. | |

FOREIGN PATENT DOCUMENTS

| | | |
|---|---|---|
| JP | 08058013 A | 3/1996 |
| JP | 11172223 A | 6/1999 |
| JP | 11181393 A | 6/1999 |
| JP | 2001098247 A | 4/2001 |
| JP | 2001172602 A | 6/2001 |
| JP | 2004115681 A | 4/2004 |

* cited by examiner

*Primary Examiner* — Michael C Miggins
(74) *Attorney, Agent, or Firm* — Browdy and Neimark, PLLC

(57) ABSTRACT

A multilayered film which is formed using a solventless adhesive, can obviate wetting deficiency even when the film is manufactured by applying the solventless adhesive to a film by coating at a high speed, exhibits the excellent laminate strength and the excellent impact resistance after a liquid content is filled into a packaging container and exhibits excellent environment friendliness, a method of manufacturing the multilayered film, and a packaging container which uses the multilayered film are provided. In the multilayered film which is formed by laminating at least an inner-layer film, an adhesive layer and an outer-layer film in order, the adhesive layer is formed of a solventless adhesive which contains a polyester-based main agent and a curing agent made of aliphatic isocyanate and alicyclic isocyanate.

10 Claims, 3 Drawing Sheets

MULTILAYER FILM USING SOLVENT-FREE ADHESIVE, METHOD FOR PRODUCING SAME AND PACKAGING CONTAINER

TECHNICAL FIELD

The present invention relates to a multi-layered film formed using a solventless adhesive and a packaging container formed using the multi-layered film.

BACKGROUND ART

A soft packaging container which is used as a pouch or a cup lid for packaging a food product, for packaging a medicinal product or for packaging cosmetics has been conventionally formed of a multi-layered film which is formed by laminating plastic films, a metal foil and the like. For example, JP 2003-118778 A, JP 2004-160860 A, JP 2004-243523 A and the like disclose a packaging container such as a pouch or a laminate tube formed of a multi-layered film.

In such a packaging container, in laminating different kinds of films such as a nylon film and a polyethylene film to each other, since both films have no adhesiveness, it is necessary to use an adhesive to make both films adhere to each other.

As an adhesive used in such a laminating operation, in general, a two-part curing type adhesive where curing starts only when a main agent and a curing agent react with each other is used. With respect to the two-part curing type adhesive, there has been known (i) a solvent adhesive where an adhesive resin is dissolved in a solvent and is applied by coating, (ii) a water-based adhesive where an adhesive is dissolved in water, (iii) a solventless adhesive which does not use a solvent and the like.

The solvent adhesive is an adhesive used in such a manner that a main agent and a curing agent are dissolved into solvents separately thus assuming a liquid state, and the main agent and the curing agent are mixed together immediately before being applied to a film by coating, and the mixture is applied to the film by coating. In general, a polyether-based main agent, a polyester-based main agent or an isocyanate-based curing agent is used.

However, the solvent adhesive evaporates a solvent when the solvent adhesive is applied to the film by coating and hence, it is not desirable in terms of an operation environment. Such a solvent adhesive is also not desirable in terms of the countermeasure to cope with the global environmental contamination. Accordingly, there has been a demand for the reduction of loads on an environment through the removal of VOC (Volatile Organic Compounds), the removal of $CO_2$, the removal of toluene or the like from a viewpoint of conversion from a solvent adhesive to a solventless adhesive.

On the other hand, the solventless adhesive is a solvent used in such a manner that a main agent and a curing agent are formed into a liquid state by heating, are mixed together immediately before being applied to a film by coating, and the mixture is applied to the film by coating. As the solventless adhesive, in general, an inexpensive polyether-based resin is used.

However, when a polyether-based resin is used for forming a multilayered film for a packaging container, although the polyether-based resin exhibits favorable high-speed coating property, there exists a drawback that the polyether-based resin exhibits low laminate strength and low impact resistance. Under such circumstances, the polyether-based resin has been used for forming a packaging container for packaging junk food since there arises no problem even when the container exhibits low laminate strength and low impact resistance. However, a polyether-based resin is rarely used as a material of a packaging container for liquid contents which is required to exhibit favorable laminate strength and favorable impact resistance.

Further, as the solventless adhesive, besides a polyether-based adhesive, a polyester-based adhesive is also named. With respect to a conventional solventless polyester-based adhesive, when the adhesive is applied by coating at a coating speed which is a low speed of approximately 30 m/min, there arises no problem even when a manufactured packaging container is filled with a liquid content an disstored. However, when the adhesive is applied by coating at a high coating speed of 150 m/min, for example, there arise drawbacks such as defective appearance, insufficient laminate strength or insufficient impact resistance caused by insufficient wetting of the adhesive with a substrate.

For example, patent document 1 discloses a solventless two-part curing type adhesive composition which contains a polyol component (A) and a polyisocyanate component (B) and exhibits viscosity of 900 mPa·s or more at a temperature of 80° C. immediately after mixing the component (A) and the component (B). The polyol component (A) is polyol having a number-average molecular weight of 800 or more or a mixture thereof, while viscosity of the component (B) at a temperature of 25° C. is 20000 mPa·s or more.

Further, patent document 2 discloses a no-solvent adhesive composition which contains: 30 to 70% by weight of polyester polyol (A) having a number-average molecular weight of 500 to 2000; 20 to 50% by weight of polyester polyol (B) having a number-average molecular weight of 500 to 2000, 5 to 30% by weight of mono-functional alcohol (C) (the total of polyester polyol (A), polyester polyol (B) and mono function alcohol amounting to 100% by weight), a trifunctional isocyanate compound (D) formed of an alicyclic isocyanate compound or an aromatic diisocyanate compound, a trifunctional isocyanate compound (E) formed of an alicyclic isocyanate compound (here, a ratio between a total isocyanate group in the above-mentioned trifunctional isocyanate compounds (D), (E) and a total hydroxyl group in polyester polyol (A), (B) and mono-functional alcohol (C) (isocyanate group/hydroxyl group) being set to 0.5/1.0 to 1.5/1.0), and polybasic acid anhydride F.

Patent document 1: JP 2001-172602 A
Patent document 2: JP 2004-115681 A

SUMMARY OF THE INVENTION

However, neither of these adhesive compositions can overcome the above-mentioned drawbacks.

Inventors of the present invention have, to overcome the above-mentioned drawbacks peculiar to a multilayered film for a packaging container and a packaging container formed by using the multilayered film, developed a multilayered film which is formed using a solventless adhesive, can obviate wetting deficiency even when the film is manufactured by applying the solventless adhesive to a film by coating at a high speed, and exhibits high impact resistance after a liquid content is filled into a packaging container and exhibits excellent environment friendliness, a manufacturing method of the multilayered film, and a packaging container which uses the multilayered film.

Although it is an object of the present invention to provide mainly a packaging container for a liquid content, in the present invention, as a liquid content, a liquid detergent, a softener, a shampoo, a beverage or the like is named.

Further, the packaging container which uses the multilayered film of the present invention means a refill pouch for a detergent, a shampoo or the like, a retort pouch for beverage, food or the like, a plastic cup which uses a multilayered film as a lid by heat-sealing the multilayered film or the like. The plastic cup uses the multilayered film of the present invention as a lid by heat-sealing the multilayered film and is preferably used as a rice container for a microwave oven.

To achieve the above-mentioned task, the present invention adopts the following constitution.

(1) A multilayered film which is formed by laminating at least an inner-layer film, an adhesive layer and an outer-layer film in order, wherein the adhesive layer is formed of a solventless adhesive which contains a polyester-based main agent and a curing agent made of aliphatic isocyanate and alicyclic isocyanate.

(2) The multilayered film described in (1) in which viscosity of the solventless adhesive is 300 to 900 mPa·s/70° C.

(3) The multilayered film described in (1) or (2) in which viscosity of the main agent of the solventless adhesive is 300 to 1000 mPa·s/70° C.

(4) The multilayered film described in any one of (1) to (3) in which the curing agent of the solventless adhesive contains 1,6-hexamethylene diisocyanate (HDI) and 3-isocyanatomethyl-3,5,5-trimethyl cyclohexyl isocyanate (IPDI).

(5) The multilayered film described in any one of (1) to (4) in which a coating quantity of an adhesive in the adhesive layer is 1.5 to 3.5 g/m².

(6) The multilayered film described in any one of (1) to (5) in which the outer layer film is a polyamide-based or polyester-based biaxially oriented film.

(7) The multilayered film described in any one of (1) to (6) in which the inner layer film is a polyolefin-based film.

(8) The multilayered film described in any one of (1) to (7) in which the multilayered film further includes one or more intermediate layers between the inner-layer film and the outer-layer film, and an adhesive layer is provided to at least one of portions between the respective layers.

(9) A method of manufacturing a multilayered laminated film comprising the steps of:

preparing a solventless adhesive by heating a main agent and a curing agent and mixing the main agent and the curing agent to each other;

applying the solventless adhesive to either one of an inner layer film and an outer layer film by coating at a coating speed of 100 to 200 m/min; and laminating either one of the inner layer film or the outer layer film to which the adhesive is not applied by coating to an adhesive surface of the film to which the adhesive is applied by coating while aligning either one of the inner layer film or the outer layer film with the adhesive surface.

(10) The method of manufacturing a multilayered laminated film described in (9), wherein the viscosity of the solventless adhesive is 300 to 900 mPa·s/70° C.

(11) A packaging container formed using the multilayered film described in any one of (1) to (8).

ADVANTAGEOUS EFFECTS OF THE INVENTION

The multilayered film of the present invention has the above-mentioned constitution and hence, it is possible to realize a multilayered film which exhibits excellent laminate strength and impact resistance together with high-speed adhesive coating property to a film using a solventless adhesive.

MODE FOR CARRYING OUT THE INVENTION

Hereinafter, an embodiment of the present invention is explained in detail in conjunction with drawings.

Figure 1:
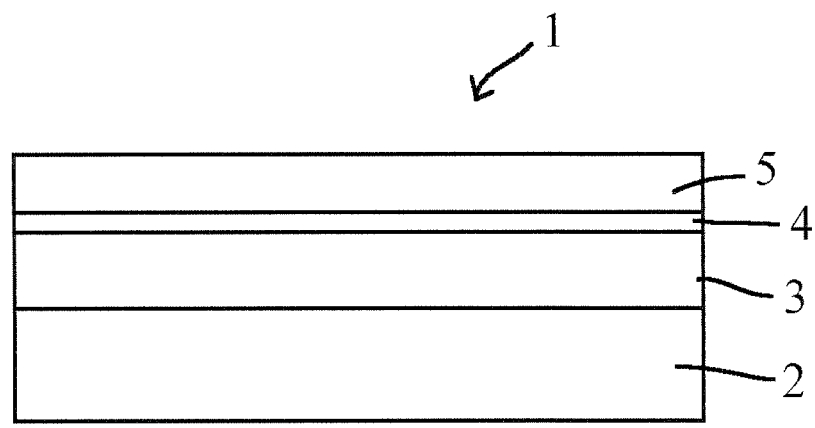
FIG. 1 is a view showing one example of a multilayered film according to the present invention.

FIG. 1 is a schematic cross-sectional view showing the embodiment of a multilayered film according to the present invention.

The multilayered film 1 is constituted of, in order from an inner layer to an outer layer, an inner layer film 2, an adhesive layer 3 and an outer layer film 5. As shown in the drawing, an ink layer 4 may be provided between the outer layer film 5 and the adhesive layer 3.

The present invention is characterized in that the adhesive layer 3 is formed of a solventless adhesive.

With respect to the constitution of the multilayered film of the present invention, the inner layer means a layer on a side where the layer is brought into contact with contents, and the outer layer means a layer which is brought into contact with outside air.

The multilayered film 1 of the present invention is characterized in that the adhesive layer 3 is formed of a solventless adhesive, and the solventless adhesive is a two-part reactive curing type adhesive constituted of a main agent and a curing agent.

As the main agent, a polyester-based resin which exhibits favorable adhesiveness with the inner layer film 2, the outer layer film 5 and the ink layer 4 (gravure ink) and exhibits the excellent laminate strength and impact resistance is used. Out of the polyester-based resin, a polyester polyol resin is particularly favorably used.

As the polyester polyol resin, it is possible to use any polyester polyol resin which is manufactured by the esterification reaction between a polybasic acid such as a succinic acid, an adipic acid, an azelaic acid, a sebacic acid, a phthalic acid, an isophtalic acid or a terephthalic acid; and a polyhydric alcohol such as ethylene glycol, 1,2-propanediol, 1,3-butanediol, 1,4-butanediol, 3-methyl-1,5-pentanediol 1,6-hexenediol, 1,4-cyclohexane di-methanol1, neopentylglycol, 3,3-bis(hydroxymethy)heptanes, diethylene glycol, dipropylene glycol, glycerin, trimethylolpropane.

With respect to specific examples of these polyester-based resins, (1) as adipate-based polyester glycol, for example, polyethylene adipate), poly(diethylene adipate), poly(propylene adipate), poly(tetramethylene adipate), poly(hexamethylene adipate) and poly(neopentyl adipate) are named. (2) As polycaprolactone-based polyester glycol, for example, poly-ϵ-caprolactone is named. (3) Besides these polyester-based resins, for example, poly(hexamethylene sebacate) and poly (hexamethylene carbonate) are named.

These compounds which are used as the main agent may be used singly, in the form of mixture of two or more compounds or in the form of copolymer. Further, when a polyurethane-based chemical compound is added to the main agent, since the ink layer which is formed on the inner side of the outer layer film usually contains a urethane content, the adhesiveness of the main agent to the ink layer is ensured. Accordingly, the addition of the polyurethane-based chemical compound can be favorably ensured.

A molecular weight of the resin which constitutes the main agent preferably be approximately 300 to 1000, and more preferably be approximately 350 to 800 in terms of a number-average molecular weight.

When the molecular weight of the main agent exceeds this range, although the impact resistance of the adhesive layer 3 is enhanced, viscosity of the adhesive (main agent) is elevated so that wetting deficiency occurs at the time of applying the adhesive by coating whereby the laminate strength and impact resistance of the multilayered film are lowered eventually.

On the other hand, when the molecular weight of the main agent is below the above-mentioned range, viscosity of the adhesive (main agent) is lowered so that coating irregularities do not occur. However, the number of terminal reactive groups is increased so that it is necessary to increase a quantity of curing agent whereby a quantity of cross linking in the adhesive layer is increased eventually. Accordingly, there arises a drawback that the hardness of the adhesive layer is elevated so that the impact resistance is lowered. Further, there also arises a drawback that the roll transfer irregularities occur so that the adhesive layer is not partially applied by coating.

The viscosity of the resin of the above-mentioned main agent compound preferably falls within a range from 300 to 1000 mPa·s/70° C. The viscosity of the main agent compound more preferably falls within a range from 300 to 700 mPa·s/70° C. In this specification, "mPa·s/70° C." expresses viscosity measured at a temperature of 70° C.

When the viscosity is larger than the range, the wetting deficiency is liable to occur at the time of applying the adhesive to the film by coating at a high speed thus lowering laminate strength and impact resistance eventually.

On the other hand, when the viscosity is smaller than the range, the roll transfer irregularities occur so that the adhesive layer is not formed whereby the laminate strength and the impact resistance are extremely lowered.

It is preferable to adjust the viscosity of the main agent compound by changing a molecular weight of the main agent compound.

Next, the curing agent in the adhesive is explained.

As the curing agent, an isocyanate compound, and aliphatic isocyanate and alicyclic isocyanate are particularly used.

For example, as the aliphatic isocyanate, butane-1,4-diisocyanate, hexamethylene diisocyanate, isopropyl diisocyanate, methylene diisocyanate, 2,2,4-trimethyl hexamethylene diisocyanate, m-tetramethyl xylylene diisocyanate, lysine diisocyanate, dimer diisocyanate prepared by converting a carboxyl group of a dimer acid with an isocyanate group and the like are named.

For example, as the alicyclic isocyanate, cyclohexane-1,4-diisocyanate, isophorone diisocyanate, dicyclohexyl-methane-4,4'-diisocyanate, 1,3-bis(methyl isocyanate)cyclohexane, methylcyclohexane diisocyanate, norbornane diisocyanate and the like are named.

There is no problem in using these aliphatic isocyanate singly or in the form of mixture consisting of two or more kinds of aliphatic isocyanate. Also there is no problem in using these alicyclic isocyanate singly or in the form of mixture consisting of two or more kinds of alicyclic isocyanate.

Further, a biuret product or an isocyanurate product which is the above-mentioned isocyanate compound, and an isocyanate group containing compound such as an adduct compound of an isocyanate group and polyol may be preferably used.

The present invention is characterized by using both the aliphatic isocyanate and the alicyclic isocyanate as the curing agent. It is particularly preferable that the curing agent contains 1,6-hexamethylene diisocyanate (HDI) and 3-isocyanatomethyl-3,5,5-trimethyl cyclohexyl isocyanate (IPDI)

In this manner, by preparing the mixture curing agent by mixing plural kinds of compounds, the multilayered film 1 of this embodiment can achieve the following tasks.

That is, due to the adhesive layer 3 which is formed of the solventless adhesive, is prepared by mixing the above-mentioned mixture curing agent and the above-mentioned main agent and constitutes the technical feature of the present invention, the multilayered film 1 of this embodiment can acquire both advantageous effects of high-speed coating of the adhesive to the film and favorable impact resistance after forming the film.

To produce a large lot of products (multilayered films for packaging containers), it is preferable to perform coating of an adhesive at a high speed of approximately 150 m/min.

The multilayered film of the present invention is characterized by forming the adhesive layer using a solventless agent and hence, it is difficult to adjust viscosity of the adhesive layer using a solvent different from a solvent adhesive. Accordingly, by setting the viscosity of the main agent to the above-mentioned range and by using the mixture curing agent as the curing agent, the viscosity of the adhesive is properly set so that the adhesive can ensure high-speed coating property.

Further, the viscosity of the curing agent is also set to a proper range as described later.

That is, when the difference between the viscosity of the curing agent and the viscosity of the main agent is large, at the time of performing the high-speed coating of the adhesive, the irregularities occur in the mixture composition of the adhesive so that there is a possibility that the laminate strength of the film is lowered eventually.

By making the difference between the viscosity of the curing agent and the viscosity of the main agent small according to the present invention, even at the time of performing the high-speed coating of the adhesive, no irregularities occur in the mixture composition of the adhesive so that it is possible to prevent the lowering of the laminate strength.

According to the present invention, even when the coating speed is 100 to 200 m/min and, more preferably, 120 to 180 m/min, it is possible to perform coating of the adhesive at a high speed without giving rise to the above-mentioned drawback.

As the curing agent which is used in the present invention, as described previously, it is preferable to use the mixture which contains 1,6-hexamethylene diisocyanate (HDI) and 3-isocyanatomethyl-3,5,5-trimethyl cyclohexyl isocyanate (IPDI).

Although the reason that the mixture of these compounds is preferable is not clarified strictly, it is estimated that the mixture of these compounds is preferable in view of the molecular structures of both compounds.

The HDI has the straight chain structure so that the HDI has the flexible and soft structure. That is, the HDI has the characteristics that although the HDI exhibits low laminate strength, the HDI exhibits the excellent impact resistance.

On the other hand, the IPDI has the cyclic structure so that the IPDI has the hard and brittle structure. That is, the IPDI has the characteristics that although the IPDI exhibits the large laminate strength, the IPDI exhibits low impact resistance.

Further, the main agent of the present invention which has low molecular weight and low viscosity exhibits the relatively low laminate strength. Due to the addition of the IPDI, the main agent can acquire an advantageous effect that the laminate strength of the main agent can be increased.

In view of the above, by mixing these two kinds of compounds, it is possible to ensure the sufficient laminate strength and the sufficient impact resistance while making the difference in viscosity between the curing agent and the main agent small.

Further, the viscosity of the above-mentioned mixture curing agent preferably falls within a viscosity range of 300-900 mPa·s/70° C., and more preferably in the vicinity of 600 mPa·s/70° C. This is because, as described above, it is necessary to make the difference in viscosity between the main agent and curing agent small.

The viscosity of the curing agent can be adjusted by changing a mixing ratio of the HDI and the IPDI. For example, when a mixing ratio of the IPDI is increased, the viscosity of the curing agent is elevated and the adhesive layer 3 becomes hard after a reaction so that although the curing agent exhibits the excellent laminate strength, the impact resistance is deteriorated.

On the other hand, when the mixing ratio of the IPDI is decreased, the viscosity of the curing agent becomes small so that the adhesive layer 3 becomes soft whereby it is possible to provide the adhesive layer which exhibits the excellent impact resistance although the laminate strength is lowered.

It is preferable to use the mixture curing agent having viscosity of 300-900 mPa·s/70° C. by selecting a mixing ratio of the HDI and the IPDI in view of characteristics of both materials.

When the viscosity of the mixture curing agent is above this range, there exists a possibility that wetting deficiency occurs at the time of applying an adhesive by coating.

On the other hand, when the viscosity of the mixture curing agent is below the above-mentioned range, there exists a possibility that the roll transfer irregularities occur so that the adhesive layer is partially eliminated whereby the both the laminate strength and the impact resistance are lowered.

The adhesive layer 3 of the present invention is a reaction cured product which is the mixture of the above-mentioned main agent and curing agent. As described above, it is preferable to set the difference in viscosity between the main agent and the curing agent as small as possible.

When the difference in viscosity between the main agent and the curing agent is large, there is a possibility that the irregularities occur in the composition of the adhesive at the time of applying the adhesive layer 3 by coating at a high speed so that cross-linking deficient portions and cross-linking excessive portions are present in mixture thus giving rise to a risk that both the laminate strength and the impact resistance of the multilayered film are deteriorated.

It is preferable to set the difference in viscosity between the main agent and the curing agent to 0-400 mPa·s/70° C. It is more preferable to set the difference in viscosity between the main agent and the curing agent to 0-300 mPa·s/70° C.

While a mixing ratio between the main agent and the curing agent used in forming the adhesive layer 3 is determined based on a quantity of reactive functional groups of the respective agents, the mixing ratio of the curing agent preferably falls within a range where the curing agent is 0.5 to 1.2 when the main agent is 1 with respect to a weight ratio.

When the mixing ratio of the curing agent is above this range, the mixing of both agents becomes insufficient so that cross-linking deficient portions and cross-linking excessive portions are present in mixture thus giving rise to a risk that the laminate strength and the impact resistance of the multi-layered film are deteriorated. On the other hand, when the mixing ratio of the curing agent is below the range, the cross-linking deficiency occurs thus giving rise to a risk that the laminate strength is lowered.

According to the present invention, since the curing agent contains the IPDI, it is possible to set the mixing ratio within the above-mentioned range.

Eventually, it is possible to prevent the non-uniform mixing of the both resins, that is, the main agent and the curing agent.

As described above, the present invention is characterized in that the adhesive which constitutes the adhesive layer 3 is formed of the solventless adhesive and hence, the selection of kinds, molecular weights and viscosities of the main agent and the curing agent of the adhesive become extremely important.

This is because the proper selection prevents wetting deficiency at the time of applying the adhesive at a high speed and ensures the laminate strength and the impact resistance of the completed multilayered film.

Although the mechanism by which "wetting deficiency" occurs at the time applying the adhesive by coating is not yet clarified at this stage, the estimated mechanism is explained hereinafter.

To consider a case where a coating speed of an adhesive is high and a coating quantity is particularly large, when the viscosity of the adhesive is excessively high, the transfer of the adhesive to the outer layer film, the inner layer film, the ink layer and the like is liable to become irregular so that partial "repellency" occurs and "repellant" portions have a small film thickness.

Although the degree of irregularities in the transfer of the adhesive is decreased due to aging performed thereafter in the wetting deficient portions, due to the difference in film thickness, lowering of the laminate strength after filling contents is liable to be induced.

Here, the estimated mechanism which brings about "lowering of the laminate strength after filling contents" is also explained.

Depending on contents such as a detergent or a bleaching agent, there may be a case where the laminate strength of the multi layered film is lowered during a filling operation or during storage. The lowering of the laminate strength of the multilayered film is considered to be brought about by a phenomenon that components in the contents permeate from the inner layer film and attack the adhesive layer. It is estimated that the adhesive layer "swells" or "is decomposed" when attacked by the components in the contents. The degree of swelling or decomposition depends on kinds of permeating components.

When the contents or the film thickness of the adhesive layer become partially non-uniform, for example, in portions having the small thickness or portions having cross-linking curing deficiency, due to the attack of components in the contents, the lowering of the laminate strength is liable to occur during storage.

According to the present invention, the viscosity of the solventless adhesive prepared by mixing the above-mentioned main agent and the curing agent is preferably set to 300-900 mPa·s/70° C., and is more preferably set to 300-700 mPa·s/70° C.

When the viscosity exceeds this numerical value range, "wetting deficiency" occurs at the time of applying the adhesive by coating, and a coating quantity of the adhesive becomes small due to "repellency". Portions where the coating quantity of the adhesive becomes small gives rise to a drawback that the lowering of the laminate strength and the impact resistance is induced.

On the other hand, when the viscosity is below this numerical value range, the transfer of the adhesive between rolls becomes defective at the time of applying the adhesive by coating so that "transfer irregularities" occur. That is, the adhesive layer partially disappears and the laminate strength and the impact resistance in the portions where the adhesive layer disappears are extremely lowered.

According to the present invention, when the solventless adhesive composition which constitutes the adhesive layer 3 contains a polyurethane-based compound besides the above-mentioned main agent and curing agent, the adhesiveness of the adhesive layer with the ink layer is ensured because the ink layer provided to the inside of the outer layer film usually contains an urethane component. Accordingly, the addition of the polyurethane-based compound is preferable from a viewpoint of ensuring adhesive of the adhesive layer 3 to the ink layer.

Further, the adhesive composition may also use a filler, a softening agent, an antioxidant, a stabilizer, an adhesion promoter, a leveling agent, an antifoaming agent, a plasticizer, an inorganic filler, an adhesive imparting resin, fibers, a coloring agent such as pigment, a usable time prolonging agent or the like.

Still further, the adhesive composition according to the present invention may also use an adhesion accelerator. As the adhesion accelerator, a coupling agent such as a silane coupling agent, a titanate coupling agent, an aluminum-based coupling agent or the like, and an epoxy resin are named. As the silane coupling agent, for example, aminosilane such as γ-aminopropyltriethoxysilane, γ-aminopropyltrimethoxysilane, N-β(aminoethyl)-γ-aminopropyltrimethoxysilane, N-β(aminoethyl)-γ-aminopropyl trimethyl dimethoxy silane, N-phenyl-γ-aminopropyl trimethoxy silane or the like, epoxysilane such as β-(3,4-epoxycyclohexyl)ethyltrimethoxysilane, γ-glycidoxypropyltrimethoxysilane, γ-glycidoxypropyltriethoxysilane, vinylsilane such as vinyl tris(β-methoxyethoxy)silane, vinyltriethoxysilane, vinyltrimethoxysilane, γ-methacryloxypropyl trimethoxysilane or the like, hexamethyldisilazane, γ-mercapto propyl trimethoxysilane and the like are named.

As the titanate coupling agent, for example, tetraisopropoxy titanium, tetra-n-butoxy titanium, butyl titanate dimer, tetra-stearyl titanate, titanium acetylacetonate, lactato titanium, tetraoctylene glycol titanate, tetra stearoxy titanium and the like are named.

As the aluminum-based coupling agent, for example, aceto alkoxy aluminum diisopropylate and the like are named.

As the epoxy resin, various commercially available epoxy resins such as an epi-bis type epoxy resin, a novolak type epoxy resin, a β-methylepichlorohydrin type epoxy resin, a cyclic oxirane type epoxy resin, a glycidyl ether type epoxy resin, a glycidyl ester type epoxy resin, a polyglycol ether type epoxy resin, a glycol ether type epoxy resin, an epoxidation fatty acid ester type epoxy resin, a polyvalence carboxylate type epoxy resin, an aminoglycidyl type epoxy resin and a resorcin type epoxy resin are named.

The adhesive compositions explained above are applied to the outer layer film 5 described later by coating and form the adhesive layer 3. When the multilayered film is used for filling liquid contents, it is preferable to set a coating quantity of the adhesive to a value which falls within a range of 1.5 to 3.5 g/m². It is more preferable to set the coating quantity of the adhesive to a value which falls within a range of 2.0 to 3.0 g/m².

Further, it is preferable to set a thickness of the adhesive layer 3 to 1 to 3 μm.

When a coating quantity of the adhesive exceeds an upper limit, wetting deficiency is liable to occur, while when the coating quantity of the adhesive becomes below a lower limit, the adhesive layer 3 is liable to be deteriorated due to components of contents and hence, there exists a possibility that the laminate strength the impact resistance after filling is deteriorated.

In coating of the adhesive composition, it is not always necessary to apply the adhesive composition to the outer layer film, and the adhesive composition may be applied to the inner layer film or the intermediate layer film. However, since the coating operation is performed at a high temperature of approximately 70° C. at the time of coating and a film transfer tension is applied to the film, it is preferable to apply the adhesive to the biaxially oriented film which exhibits high tensile strength.

Next, the outer layer film 5 according to the present invention is explained. As the outer layer film 5, a film which exhibits the excellent thermal size stability is preferably used. This is because the outer layer film 5 is subjected to a baking temperature of approximately 80° C. after applying gravure printing on an inner surface side of the outer layer film so that it is necessary for the outer layer film 5 to withstand this temperature. As the outer layer film 5, it is preferable to use a biaxially oriented film in view of two main factors, that is, the large heat resistance and the large tensile strength.

As such an outer layer film, for example, a polyamide-based film or a polyester-based film is used.

With respect to the film to be used as the outer layer film, a material resin of the polyamide-based film is not particularly limited and, for example, nylon 6, nylon 8, nylon 6, 6, nylon 6/6,6 copolymer, nylon 6,10, metaxylylene adipamide (MXD 6), nylon 11, nylon 12 can be used.

As a specific resin material of the polyester-based film, polyethylene terephthalate (PET), polybutylene terephthalate (PBT) and the like are named. Alternatively, provided that properties of these material resins are not damaged, it is possible use copolyester which contains other polyester unit. As such copolymer components for forming copolyester, a dicarboxlylic acid component such as an isophthalic acid, p-β-oxyethoxy benzonate, a naphthalene 2,6-dicarboxlic acid, a diphenoxyethane-4,4'-dicarboxlylic acid, a 5-sodium sulfo isophthalic acid, an adipic acid, a sebacic acid or an alkyl ester derivative of these compounds; a glycol component such as propylene glycol, 1,4-butandiol, neo pentyl glycol, 1,6-hexylene glycol, cyclohexane dimethanol, ethylene oxide addition of bisphenol A, diethylene glycol, triethylene glycol and the like can be named.

Although a thickness of the outer layer film may be suitably selected depending on a usage or the like of the multilayered film, it is preferable to set the thickness of the outer layer film to 10 to 30 μm when the resin material is nylon. It is preferable to set the thickness of the outer layer film to 6 to 28 μm when the polyester film is a PET film.

Corona treatment is preferably applied to a contents-side surface of the outer layer film 5 to ensure the adhesiveness.

Further, although the ink layer 4 is formed by printing on an inner side (contents side) of the outer layer film 5 in general, it is preferable to set a thickness of the ink layer 4 to 2 to 8 μm.

Next, the inner layer film 2 of the multilayered film 1 according to the present invention is explained.

As the inner layer film 2, for manufacturing a pouch or a heat sealing lid, it is preferable to use a polyolefin-based film such as a polyethylene (PE) film or a polypropylene (PP) film which exhibits the excellent heat sealing property.

Although a thickness of the inner layer film is not particularly limited, for example, it is preferable to set the thickness of the inner layer film to 50 to 200 μm when the inner layer film is formed of the polyethylen film, and it is preferable to set the thickness of the inner layer film to 30 to 150 μm when the inner layer film is formed of the polypropylene film. Further, the inner layer film is preferably formed of a non-oriented film.

In the present invention, the multilayered film may further include one or more intermediate layers between the inner layer film and the outer layer film. In this case, an adhesive layer may be provided to at least one of portions between the respective layers.

Figure 2:
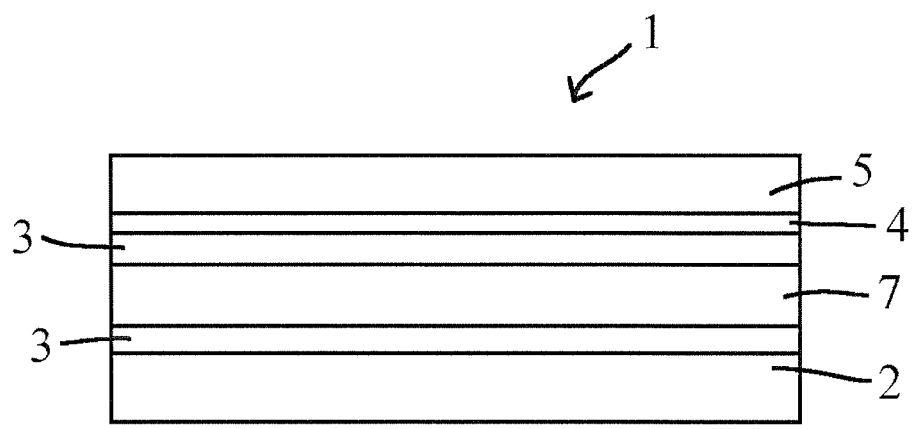
FIG. 2 is a view showing one example of a multilayered film according to the present invention.

For example, as in the case of the multilayered film shown in FIG. 2, an intermediate layer 7 may be provided between the inner layer film 2 and the outer layer film 5. In the embodiment shown in FIG. 2, the five layered constitution consisting of the inner layer film, a first adhesive layer, the intermediate layer, a second adhesive layer and the outer layer film from the inner layer side. It is possible to use only one of the first adhesive layer and the second adhesive layer. An ink layer may be further provided between the respective layers. The multilayered film may include a plurality of intermediate layers or the multilayered film may adopt the seven or more layered constitution as a whole.

As a material for forming the intermediate layer, a resin having gas barrier property is named. For example, a nylon resin, particularly, an aliphatic nylon such as nylon 6, nylon 8, nylon 11, nylon 12, nylon 6,6, nylon 6,10, nylon 10,6, nylon 6/6,6 copolymer, a partial aromatic nylon such as polymetaxylene adipamide, a polyglycolate resin, an aluminum foil are named.

Further, the film made of the above-mentioned material may be provided with a vapor-deposited layer such as a silicon oxide vapor-deposited film, an organic silicon metal film, a diamond-like carbon vapor-deposited film or a carbon hydride vapor-deposited film.

Further, the intermediate layer may be also formed using polyethylene (PE) such as lowdensitypolyethylene (LDPE), medium density polyethylene (MDPE), high density polyethylene (HDPE) linear low density polyethylene (LLDPE), linear very low-density polyethylene (LVLDPE), polypropylene (PP), ethylene-propylene copolymer, polybutene-1, ethylene-butene-1 copolymer, propylene-butene-1 copolymer, ethylene-propylene-butene-1 copolymer, ethylene-vinyl-acetate copolymer (EVA), ion cross-linking olefin copolymer (ionomer) or a mixture of these compounds may be used.

Further, an inorganic compound may be vapor-deposited to a surface of the above-mentioned olefin-based resin or a resin having gas barrier property such as polyvinyl alcohol may be applied to a surface of the above-mentioned olefin-based resin by coating.

A thickness of the intermediate layer may preferably be set to 5 to 100 μm.

Subsequently, a method of manufacturing a multilayered film according to the present invention is explained. The method of manufacturing a multilayered film according to the present invention includes the steps of: preparing a solventless adhesive by heating the main agent and the curing agent and by mixing the main agent and the curing agent to each other; applying the solventless adhesive to the outer layer film by coating at a coating speed of 100 to 200 m/min; and laminating the inner layer film to which the adhesive is not applied by coating to an adhesive surface of the outer layer film to which the adhesive is applied by coating while aligning the inner layer film to which the adhesive is not applied by coating.

Alternatively, the method of manufacturing a multi layered film according to the present invention may include the steps of: preparing a solventless adhesive by heating the main agent and the curing agent and mixing the main agent and the curing agent to each other; applying the solventless adhesive to the inner layer film by coating at a coating speed of 100 to 200 m/min; and laminating the outer layer film to which the adhesive is not applied by coating to an adhesive surface of the inner layer film to which the adhesive is applied by coating while aligning the outer layer film to which the adhesive is not applied by coating.

Here, the viscosity of the solventless adhesive may preferably be set to 300 to 900 mPa·s/70° C.

When the multilayered film includes the intermediate layer, the multilayered film is manufactured by repeating the step of laminating the film to which the adhesive is not applied by coating to the film to which the adhesive is applied by coating while aligning the film to which the adhesive is not applied by coating plural times.

Figure 3:
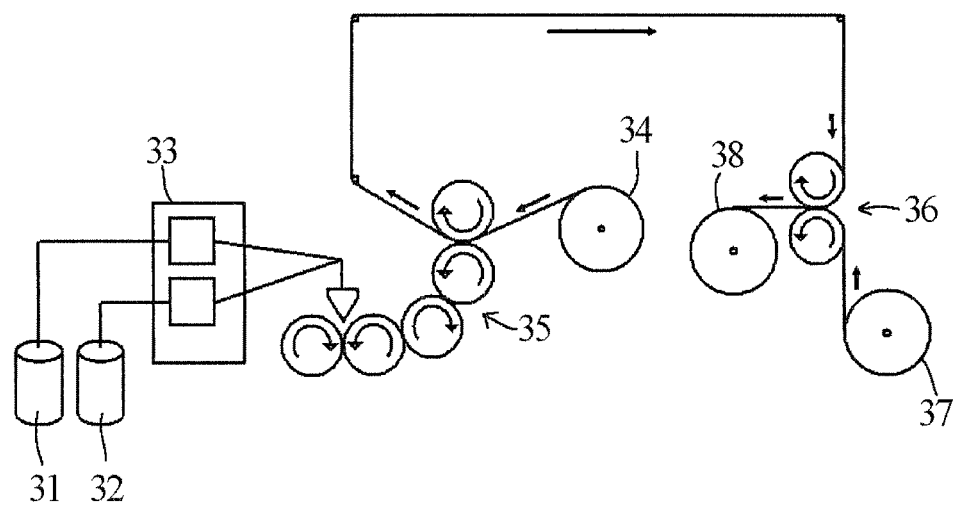
FIG. 3 is a view showing a laminator used in the present invention.

FIG. 3 is a laminator used for the lamination in the present invention.

In FIG. 3, numeral 31 indicates a main agent tank, 32 indicates a curing agent tank, numeral 33 indicates an adhesive supply device, numeral 34 indicates an outer layer film, numeral 35 indicates an adhesive coating part, numeral 36 indicates a lamination part, numeral 37 indicates an inner layer film, and numeral 38 indicates a multilayered film.

To explain one example of the lamination step of the present invention in conjunction with FIG. 3, the main agent in the main agent tank 31 and the curing agent in the curing agent tank 32 are heated and, and a predetermined quantity of main agent and a predetermined quantity of curing agent are respectively supplied by the adhesive supply device 33. The main agent and the curing agent which are supplied respectively are mixed immediately before first rolls of the coating part and are supplied to the coating part 35. The outer layer film 34 is made to pass through the coating part 35 and an adhesive is applied to an adhesive surface of the outer layer film 34 by coating at a speed of approximately 150 m/min and, thereafter, the inner layer film 37 is compression-bonded by heating to the adhesive surface of the outer layer film 34 at a temperature of 40° C. to 80° C. in alignment with the inner layer film 37 at a lamination speed of approximately 150 m/min by nipping both films 34, 37 by a rubber roll and a metal roll, and the compression-bonded laminate film is wound. Aging is applied to the wound laminate film at a temperature of 30 to 70° C. so as to accelerate curing of the adhesive.

With respect to aging, aging is applied to the laminate film at a constant temperature so as to accelerate a curing speed of the adhesive or to allow the laminate film to acquire high adhesive strength. Although time and temperature for aging differ depending on a kind of the adhesive, the film constitution, the lamination condition and the like, it is preferable to perform aging for several days at a temperature of 30 to 70° C.

The above-mentioned manufacturing method constitutes merely one example, and the laminate film may be manufactured using other methods.

EXAMPLE

Next, the present invention is further explained in conjunction with examples. However, the present invention is not limited by the following specific examples.

Examples 1 to 4, Comparison Example 1

Table 1 shows the compositions of adhesives used in the examples and the comparison example.
(Outer Layer Film, Inner Layer Film)

To prepare an outer layer film, white ink containing titanium oxide pigment is printed with a thickness of 5 μm on one surface of a biaxially oriented nylon film having a film thickness of 15 μm by gravure printing. As an inner layer film, a non-oriented linear low density polyethylene (LLDPE) film having a film thickness of 15 μm is used.
(Formation of Multilayered Film)

A main agent and a curing agent of an adhesive shown in Table 1 are heated in tanks at a temperature of 80° C. respectively and the main agent and the curing agent are supplied to a coater part respectively by an adhesive supply device by way of pipes such that the main agent and the curing agent assume a weight mixing ratio shown in Table 1. The main agent and the curing agent are mixed to each other immediately before rolls of the adhesive coating device. The adhesive and the outer layer film are made to pass through the rolls of the coater so that the adhesive is applied to a printing surface of the outer layer film by coating at a temperature of 70° C. whereby an adhesive coated film is prepared. A coating quantity of the adhesive is 2.5 g/m$^2$ and a coating speed is 150 m/min.

The adhesive coated film is transferred to a lamination part and the adhesive coated film is laminated to an inner layer film by way of an adhesive layer under pressure at a temperature of 60° C. thus forming a multilayered film. The lamination speed is 150 m/min. The multilayered film is held at a temperature of 40° C. for 3 days so as to cure the adhesive.

The viscosity of the adhesive is measured by a method stipulated in JIS K 7117-2 using a B8L type viscometer made by TOKIMEC Ltd.

A molecular weight is measured by a GPC (gel permeation chromatography). A coating quantity of the adhesive is measured as follows. A multilayered film is formed such that a biaxially oriented polypropylene (OPP) film is used as the outer layer film and the adhesive is applied to the outer layer film by coating under same conditions as an example, and the inner layer film is formed using a biaxially oriented polypropylene (OPP) film. A multilayered film piece having a size of 100 mm×100 mm is cut away from the multilayered film and a weight of the multilayered film piece is measured. Thereafter, the inner and outer layer films are peeled off from the adhesive layer, the adhesive layer is dissolved by ethyl acetate and, thereafter, a weight of only the inner and outer layer films is measured. A weight of the adhesive layer is measured by subtracting the weight of the inner and outer layer films from the previously measured weight.
(Preparation of Pouch)

A bottom member having a width of 130 mm and a folding width of 36 mm is cut out from the multilayered film prepared in the above-mentioned manner. The bottom member is sandwiched between two sheets of multilayered films whose inner surface layers are aligned with each other in a state where an inner surface layer of the bottom member is aligned with the inner surface layers of two sheets of multilayered films. The bottom member is heat-sealed to two sheets of multilayered films at a temperature of 200° C. Thereafter, inner layer sides of two sheets of multilayered films are aligned with each other and are heat-sealed to each other on two sides thus forming a refill pouch having a size of 130 mm wide and 260 mm high and a volume of 540 ml.

Next, the multilayered films and the pouches which are obtained by the examples and the comparison example are evaluated in accordance with the following methods.
(Wettability)

The evaluation method of "wettability" is conducted such that immediately after the lamination, an area of 1 m wide and 3 m long of a multilayered film is inspected visually so as to evaluate the degree of repellant portions. The evaluation "good" is given to the multilayered film when there is no repellant portion in the multilayered film. The evaluation "fair" is given to the multilayered film when the maximum diameter of the repellant portion in the multilayered film is 2 mm or less. The evaluation "bad" is given to the multilayered film when the maximum diameter of the repellant portion in the multilayered film exceeds 2 mm. The multilayered films which are given evaluations "good" or "fair" are regarded as products which fall within an allowable range.
(Laminate Strength)

540 g of Attack (trademark of a product made by Kao Ltd.) is filled in a refill pouch prepared by using the multilayered film, and is hermetically sealed. After storing the refill pouch for 1 month at a temperature of 55° C., a portion of the multilayered film forming a side wall of the pouch which constitutes a gas-phase portion is cut away by a size of 15 mm×100 mm. An inner layer and an outer layer of the cut-away portion are clamped by a chuck of a constant-speed tensile tester, the outer layer and an inner layer of the cutaway portion are peeled off from each other at a pulling speed of 300 mm/min, and a peel-off load is measured. An average value of peel-off loads is set as an individual laminate strength of a specimen, and an average value of individual laminate strengths in the height direction (n=5) and in the width direction (n=5) of the refill pouch where the length direction of the specimen is the height direction is set as a laminate strength and is expressed by N/15 min.

The evaluation "good" is given to the multilayered film when the laminate strength is equal to or more than 3.0N/15 min, and the evaluation "bad" is given to the multilayered film when the laminate strength is less than 3.0N/15 min.
(Evaluation of Impact Resistance)

540 g of ion-exchanged water at a temperature of 5° C. is filled in a pouch prepared by using the multilayered film and, thereafter, the pouch is hermetically sealed by heat sealing thus producing 20 sets of sample pouches. The fall of each sample pouch from a height of 1.2 m with a bottom portion directed in the falling direction is repeated 10 times and, thereafter, such falling in the horizontal posture is repeated 10 times. Then, the number of broken pouches is inspected.

The evaluation is made with n being set to 20 (n=20) and the evaluation "good" is given when there is no broken pouch and "bad" is given when there are one or more broken pouches.
(Overall Evaluation)

The overall evaluation is conducted based on the following criteria.

Good: Received good evaluation on wettability, good evaluation on laminate strength and good evaluation on impact resistance Fair: Received fair evaluation on wettability, good evaluation on laminate strength and good evaluation on impact resistance Bad: Received bad evaluation on any one of wettability, laminate strength and impact resistance
(Result)

The previously described films are used as the multilayered films and pouches for test, and adhesives are applied to the multilayered films and pouches by coating in accordance with the above-mentioned method by adopting the adhesive conditions shown in Table 1 thus preparing the multilayered films and the pouches using the multilayered films.

The evaluation is made with respect to the multilayered films and the pouches prepared in this manner, and the result of the evaluation is shown in Table 1.

The followings are found out from Table 1.

In the example 1, a polyester resin having viscosity of 500 mPa·s/70° C. and a number-average molecular weight of 750 is used as a main agent. HDI and IPDI are mixed to each other as curing agents thus preparing a mixture curing agent having viscosity of 600 mPa·s/70° C. and a number-average molecular weight of 500. The main agent and the mixture curing agent are mixed at a mixing ratio of 30:20 by weight thus forming an adhesive having viscosity of 540 mPa·s/70° C. and the adhesive is applied to a film printing surface side of an outer layer film.

The wettability of the obtained multilayered film is "good", the laminate strength of the obtained pouch is 3.7N/15 mm, and the number of broken pouches in a impact resistance test is 0 and hence, the overall evaluation is "good".

In the example 2, the test is carried out in the same manner as the example 1 except for the following. That is, in the example 2, a polyester resin having viscosity of 300 mPa·s/70° C. and a number-average molecular weight of 390 is used as a main agent. An HDI and an IPDI are mixed to each other as curing agents thus preparing a mixture curing agent having viscosity of 300 mPa·s/70° C. and a number-average molecular weight of 460, and the viscosity of the adhesive is 300 mPa·s/70° C.

The wettability of the obtained multilayered film is "good", the laminate strength of the obtained pouch is 3.8N/15 mm, and the number of broken pouches in a impact resistance test is 0 and hence, the overall evaluation is "good".

In the example 3, the test is carried out in the same manner as the example 1 except for the following. That is, in the example 3, a polyester resin having viscosity of 700 mPa·s/70° C. and a number-average molecular weight of 790 is used as a main agent. HDI and IPDI are mixed to each other as curing agents thus preparing a mixture curing agent having viscosity of 900 mPa·s/70° C. and a molecular weight of 550, and the viscosity of the adhesive is 780 mPa·s/70° C.

The wettability of the obtained multilayered film is "good", the laminate strength of the obtained pouch is 3.5N/15 mm, and the number of broken pouches in a impact resistance test is 0 and hence, the overall evaluation is "good".

In the example 4, the test is carried out in the same manner as the example 1 except for the following. That is, in the example 4, a polyester resin having viscosity of 980 mPa·s/70° C. and a number-average molecular weight of 850 is used as a main agent. HDI and IPDI are mixed to each other as curing agents thus preparing a mixture curing agent having viscosity of 600 mPa·s/70° C. and a number-average molecular weight of 500, wherein a mixing ratio of the main agent and the mixture curing agent is 20:10, and the viscosity of the adhesive is 860 mPa·s/70° C.

The wettability of the obtained multilayered film is "fair", the laminate strength of the obtained pouch is 3.3N/15 mm, and the number of broken pouches in a impact resistance test is 0 and hence, the overall evaluation is "fair".

In the comparison example 1, the test is carried out in the same manner as the example 1 except for the following. That is, in the comparison example 1, a polyester resin having viscosity of 6600 mPa·s/70° C. and a number-average molecular weight of 1400 is used as a main agent. HDI having viscosity of 160 mPa·s/70° C. and a molecular weight of 400 is used as a curing agent, a main agent and a curing agent are mixed to each other at a mixing ratio of 25:10 by weight, and the viscosity of the adhesive is 4760 mPa·s/70° C.

The wettability of the obtained multilayered film is "bad", the laminate strength of the obtained pouch is 2.8N/15 mm, and the number of broken pouches in a impact resistance test is 1 and hence, target values cannot be acquired with respect to the wettability, the laminate strength and the impact resistance test whereby the overall evaluation is "bad".

TABLE 1

|  |  | example 1 | example 2 | example 3 | example 4 | comparison example 1 |
|---|---|---|---|---|---|---|
| mainagent | components of main agent | polyester resin | polyester resin | polyester resin | polyester resin | polyester resin |
|  | molecular weight of main agent | 750 | 390 | 790 | 850 | 1400 |
|  | viscosity of main agent (mPa · s/70° C.) | 500 | 300 | 700 | 980 | 6600 |
| curing agent | components of curing agent | HDI + IPDI | HDI + IPDI | HDI + IPDI | HDI + IPDI | HDI |
|  | molecular weight of curing agent | 500 | 460 | 550 | 500 | 400 |
|  | viscosity of curing agent (mPa · s/70° C.) | 600 | 300 | 900 | 600 | 160 |
| adhesive | mixing ratio (main agent/curing agent) by weight | 30/20 | 30/20 | 30/20 | 20/10 | 25/10 |
|  | viscosity (mPa · s/70° C.) | 540 | 300 | 700 | 860 | 4760 |
|  | wettability | Good | Good | Good | Fair | Bad |
|  | laminate strength (N/15 mm) | 3.7 | 3.8 | 3.5 | 3.3 | 2.8 |
|  | the number of broken pouches in impact resistance test | 0/20 | 0/20 | 0/20 | 0/20 | 1/20 |
|  | overall evaluation | Good | Good | Good | Fair | Bad |

*molecular weight being number-average molecular weight

INDUSTRIAL APPLICABILITY

The multilayered film of the present invention includes the adhesive layer formed by using the solventless adhesive, and is suitable for the manufacture of a packaging container such as a refill pouch, a retort pouch or the like in which a liquid such as a detergent, a softener, a bleaching agent, a shampoo, a conditioner or a beverage is filled as contents.

The multilayered film of the present invention is suitable for high speed coating of an adhesive and exhibits the excellent impact resistance and the excellent laminate strength.

| Explanation of symbols | |
|---|---|
| 1: | multilayered film |
| 2: | inner layer film |
| 3: | adhesive layer |
| 4: | ink layer |
| 5: | outer layer film |
| 7: | intermediate layer |
| 31: | main agent tank |
| 32: | curing agent tank |
| 33: | adhesive supply device |
| 34: | outer layer film |
| 35: | adhesive coating part |
| 36: | lamination part |
| 37: | inner layer film |
| 38: | outer layer film |

The invention claimed is:

1. A multilayered film which is formed by laminating at least an inner-layer film, an adhesive layer and an outer-layer film in order, and
wherein the adhesive layer is formed of a solventless adhesive which contains a polyester-based main agent and a curing agent made of aliphatic isocyanate and alicyclic isocyanate,
wherein the curing agent of the solventless adhesive contains 1,6-hexamethylene diisocyanate (HDI) and 3-isocyanatomethyl-3,5,5-trimethyl cyclohexyl isocyanate (IPDI).

2. The multilayered film according to claim 1, wherein viscosity of the solventless adhesive is 300 to 900 mPa·s/70° C.

3. The multilayered film according to claim 1, wherein viscosity of the main agent of the solventless adhesive is 300 to 1000 mPa·s/70° C.

4. The multilayered film according to claim 1, wherein a coating quantity of an adhesive in the adhesive layer is 1.5 to 3.5 g/m$^2$.

5. The multilayered film according to claim 1, wherein the outer layer film is formed of a polyamide-based or polyester-based biaxially oriented film.

6. The multilayered film according to claim 1, wherein the inner layer film is formed of a polyolefin-based film.

7. The multilayered film according to claim 1, wherein the multilayered film further includes one or more intermediate layers between the inner-layer film and the outer-layer film, and an adhesive layer is provided to at least one of portions between the respective layers.

8. A packaging container comprising the multilayered film according to claim 1.

9. A method of manufacturing a multilayered film according to claim 1, comprising the steps of:
preparing a solventless adhesive by heating a main agent and a curing agent and mixing the main agent and the curing agent to each other, wherein the curing agent of the solventless adhesive contains 1,6-hexamethylene diisocyanate (HDI) and 3-isocyanatomethyl-3,5,5-trimethyl cyclohexyl isocyanate (IPDI);
applying the solventless adhesive to either one of an inner layer film and an outer layer film by coating at a coating speed of 100 to 200 m/min; and
laminating either one of the inner layer film or the outer layer film to which the adhesive is not applied by coating to an adhesive surface of the film to which the adhesive is applied by coating while aligning either one of the inner layer film or the outer layer film with the adhesive surface.

10. The method of manufacturing a multilayered film according to claim 9, wherein the viscosity of the solventless adhesive is 300 to 900 mPa·s/70° C.

* * * * *